(12) United States Patent
Ricketts et al.

(10) Patent No.: US 12,507,629 B2
(45) Date of Patent: Dec. 30, 2025

(54) CENTER SECTION REEL FOR A HEADER OF AN AGRICULTURAL HARVESTER

(71) Applicant: CNH Industrial America LLC, New Holland, PA (US)

(72) Inventors: Jonathan E. Ricketts, Coal Valley, IL (US); Zachary Harmon, Robesonia, PA (US); Dan Garland, Solon, IA (US)

(73) Assignee: CNH Industrial America LLC, New Holland, PA (US)

( * ) Notice: Subject to any disclaimer, the term of this patent is extended or adjusted under 35 U.S.C. 154(b) by 905 days.

(21) Appl. No.: 17/708,136

(22) Filed: Mar. 30, 2022

(65) Prior Publication Data
US 2023/0309451 A1    Oct. 5, 2023

(51) Int. Cl.
*A01D 57/02*     (2006.01)
*A01D 69/00*     (2006.01)
*A01D 41/14*     (2006.01)

(52) U.S. Cl.
CPC .............. *A01D 57/02* (2013.01); *A01D 69/00* (2013.01); *A01D 41/14* (2013.01)

(58) Field of Classification Search
CPC ........ A01D 57/00–57/30; A01D 41/00–41/16; A01D 69/00
See application file for complete search history.

(56) References Cited

U.S. PATENT DOCUMENTS

| 5,904,032 | A  | * | 5/1999 | Rippel | A01D 41/04 56/16.5 |
| 6,453,655 | B2 | * | 9/2002 | Ferraris | A01D 57/03 56/220 |
| 7,426,817 | B2 | * | 9/2008 | Coers | A01D 57/02 56/14.4 |

(Continued)

FOREIGN PATENT DOCUMENTS

| EP | 3123855 A1 | 2/2017 |
| EP | 3434097 A1 | 1/2019 |

(Continued)

OTHER PUBLICATIONS

Extended European Search Report and Written Report for Application No. PCT/US2023/016873 dated Jul. 20, 2023 (13 pages).

*Primary Examiner* — Joseph M Rocca
*Assistant Examiner* — Madeline I Runco
(74) *Attorney, Agent, or Firm* — Buchanan Ingersoll & Rooney PC

(57) ABSTRACT

A draper header of an agricultural harvester comprising a first reel, a second reel spaced from the first reel a predetermined distance, and a center belt reel assembly between the first and second reels. The center belt reel assembly includes an endless belt rotationally driven about a rotational axis substantially parallel to a central rotational axis of one of the first and second reels, wherein the endless belt has a width that extends substantially the predetermined distance. The endless belt is rotationally driven by one of the first and (Continued)

second reels for conveying grain received between the first and second reels. As a result of the center belt reel assembly, grain between the first and second reels is fed to the center of the header where it may be conveyed to and processed by the harvester.

17 Claims, 5 Drawing Sheets

(56) References Cited

U.S. PATENT DOCUMENTS

| | | | |
|---|---|---|---|
| 8,176,716 B2 | 5/2012 | Coers et al. | |
| 8,387,351 B2 | 3/2013 | Guyer | |
| 9,392,745 B2* | 7/2016 | Bertino | A01D 69/06 |
| 9,526,209 B2 | 12/2016 | Honey | |
| 9,775,295 B2 | 10/2017 | Remillard | |
| 9,820,440 B2 | 11/2017 | Jost et al. | |
| 10,920,851 B1* | 2/2021 | Cook | F16G 3/10 |
| 2007/0289278 A1* | 12/2007 | Coers | A01D 57/02 |
| | | | 56/14.4 |
| 2017/0059027 A1 | 3/2017 | Jasper | |
| 2018/0242525 A1 | 8/2018 | Schwinn | |
| 2019/0014720 A1* | 1/2019 | Schropp | A01D 57/20 |
| 2021/0137009 A1* | 5/2021 | Deichmann | A01D 61/02 |
| 2023/0397537 A1* | 12/2023 | Malkowich | A01D 57/04 |

FOREIGN PATENT DOCUMENTS

| | | |
|---|---|---|
| EP | 3669636 A1 | 6/2020 |
| WO | 2020176739 A1 | 9/2020 |

\* cited by examiner

CENTER SECTION REEL FOR A HEADER OF AN AGRICULTURAL HARVESTER

The exemplary embodiments of present invention relate generally to a header of a plant cutting machine (e.g., a combine harvester) and, more specifically, to a draper header having a center section belt reel assembly between first and second adjacent reels.

BACKGROUND OF THE DISCLOSURE

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. The header can be a multi-section header having first and second adjacent reels for collecting crop cut by the cutter bar. The collected crops are then transported via a conveyor such as a draper belt towards a feederhouse of the header.

In conventional dual reel headers, there exists a center section that the reels do not span. As a consequence, crop material is not fed about the center of the header. Reels having tines bent toward the open center section have not solved the problem. A dual reel system requires that there be a lift arm that supports a medial end of each of the reels. Consequently, bent reel tines or bats cannot pass through the center of the header where the lift arm is situated.

BRIEF SUMMARY OF THE DISCLOSURE

In accordance with an exemplary embodiment there is provided a draper header of an agricultural harvester comprising a first reel, a second reel spaced from the first reel a predetermined distance, and a center belt reel assembly between the first and second reels. The center belt reel assembly includes an endless belt rotationally driven about a rotational axis substantially parallel to a central rotational axis of one of the first and second reels, wherein the endless belt has a width that extends substantially the predetermined distance.

In accordance with the exemplary embodiment, there is provided a draper header of an agricultural harvester having first and second adjacent reels. A rotatable center belt reel assembly is situated between the first and second reels for conveying grain received between the first and second reels. When the subject disclosure is used in combination with an agricultural harvester, the disclosure overcomes disadvantages of conventional headers by providing a header having a centrally located belt reel that effectively conveys grain that passes between the first and second reels.

Other features and advantages of the subject disclosure will be apparent from the following more detail description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Figure 1:
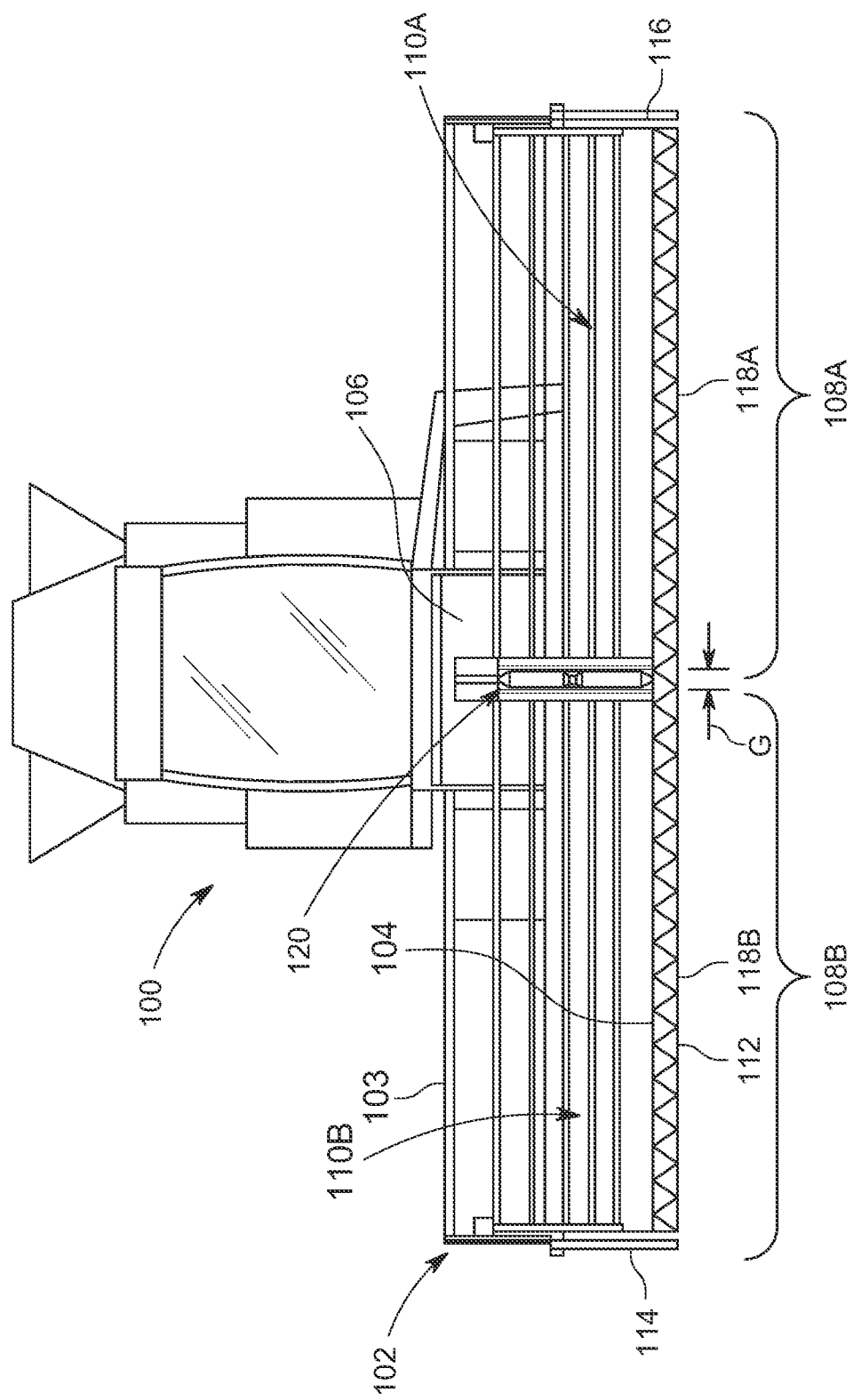
FIG. 1 is a front elevation view of an agricultural harvester including a header in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the intermediate of a body. The term "proximal" shall mean closer towards the intermediate of a body and/or away from the "distal" end. The words "inwardly" and "outwardly" refer to directions toward and away from, respectively, the geometric intermediate of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, FIG. 1 illustrates an agricultural harvester 100 in accordance with an exemplary embodiment of the present disclosure. For exemplary purposes only, the agricultural harvester is illustrated as a combine harvester. The harvester 100 includes a header 102 attached to a forward end of the harvester 100, which is configured to cut crops including, without limitation, small grains (e.g., wheat, soybeans, grain, etc.), and to induct the cut crops into a feederhouse 106 as the harvester moves forward over a crop field.

The header 102 includes a frame 103 having a floor 104 that is supported in desired proximity to the surface of a crop field. First and second cutting assemblies 108A, 108B extend transversely along a forward edge of the floor 104, i.e., in a widthwise direction of the harvester. The first and second cutting assemblies 108A, 108B are configured to cut crops in preparation for induction into the feederhouse 106. The header may include one or more draper conveyor belts for conveying cut crops to the feederhouse 106, which is configured to convey the cut crops into the harvester 100 for threshing and cleaning as the harvester moves forward over a crop field. The header 102 further includes a first elongated, rotatable reel 110A and a second, elongated rotatable reel 110B spaced from the first reel a predetermined distance "G". Reels 110A, 110B extend above and in close proximity to the first and second cutting assemblies 108A, 108B. The rotatable reels 110A, 110B are configured to cooperate with the one or more draper conveyors in conveying cut crops to the feeder house 106 for threshing and cleaning.

The cutting assemblies 108A, 108B extend along a forward edge 112 of the floor 104, and are generally bounded by a first side edge 114 and an opposing second side edge 116, both adjacent to the floor 104.

According to an exemplary embodiment as shown in FIG. 1, the cutting assemblies 108A, 108B include a first cutter bar 118A and a second cutter bar 118B. The cutting assemblies 108A, 108E are driven by a knife drive assembly, unillustrated in FIG. 1, that drives cutter knife heads in oscillating motion whereby the knife heads move laterally to the left and right. Exemplary cutter knife heads applicable to the present exemplary embodiments are disclosed e.g., in U.S. Pat. Nos. 7,730,709 and 8,151,547, the entire disclosures of which are incorporated by reference herein in their entirety for all purposes. Exemplary knife drive assemblies applicable to the present exemplary embodiments include a wobble box, an epicyclic drive, etc.

Figure 2:
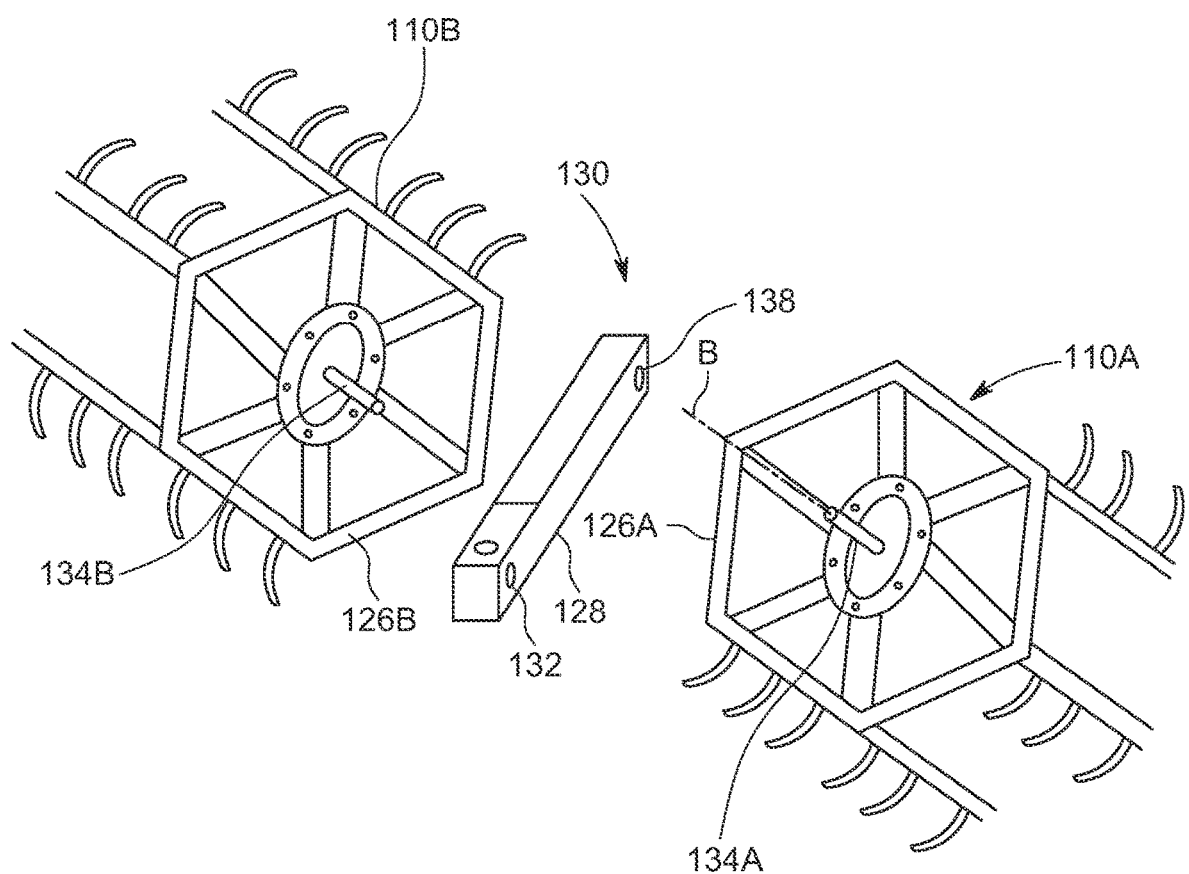
FIG. 2 is an exploded perspective view of the header of FIG. 1 with certain elements omitted for purposes of illustration.
Figure 3:
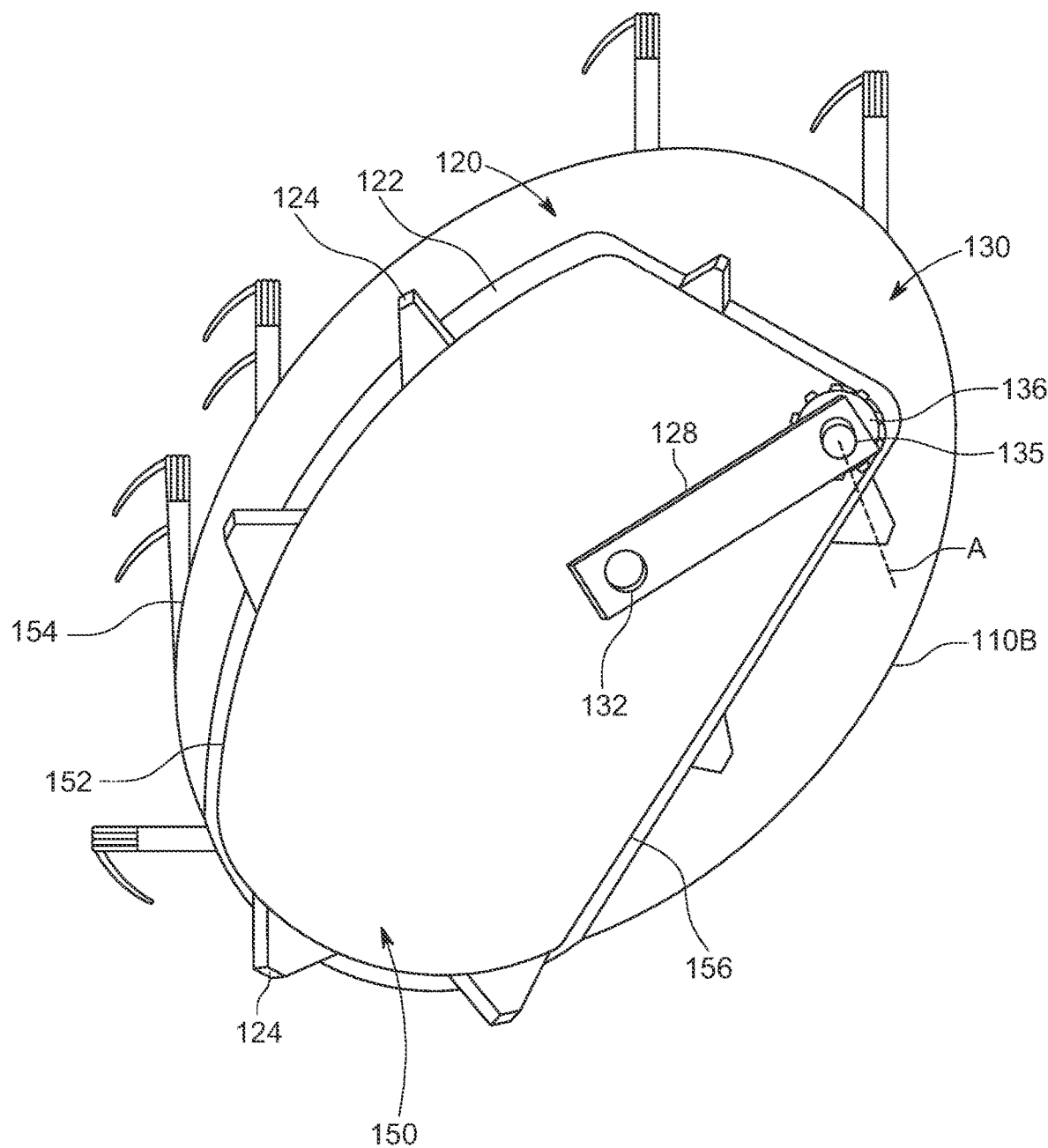
FIG. 3 is an end perspective view of a first reel and a center belt reel assembly of the header of FIG. 1.

FIGS. 1 and 3 additionally show that the header 102 additionally comprises a center belt reel assembly 120 mounted between the first and second reels 110A, 110B. The center belt reel assembly 120 includes an endless belt 122 rotationally driven about a rotational axis "A" (FIG. 3) substantially parallel to a central rotational axis "B" (FIG. 2) of one of the first and second reels. The endless belt has a width that extends substantially the predetermined distance G between the first and second reels. The endless belt can comprise a V-belt, a flat belt, or a cog belt (FIG. 3), and an exterior surface of the endless belt carries a plurality of lugs 124 for conveying grain passing between the first and second reels. The lugs 124 can be constructed e.g., as finger-like projections.

Referring to FIG. 2, the first reel 110A has a medial end 126A adjacent a medial end 126B of the second reel 110B defining the predetermined distance G between the first and second reels. A center reel support 128 is connected to the header frame 103 and supports the center belt reel assembly 120. The center reel support extends forwardly from the header frame 103 within the predetermined distance G between the first and second reels. A fore end of the center reel support 128 includes a first through opening 132 for rotatably receiving medial ends of reel drive shafts 134A, 134B of the first and second reels 110A, 110B. An aft end of the center reel support 128 includes a second through opening 138 for rotatably receiving a driven shaft 135, described below.

As shown in FIG. 3, the center belt reel assembly further comprises a drive 130 for driving rotation of the endless belt 122. According to an aspect, the drive 130 comprises the driven shaft 135. The driven shaft 135 can be operatively connected to a reel drive shaft of 134A or 134B of one of the first and second reels 110A, 110B via gears, a belt and pulleys, a chain and sprockets, or the like. The drive 130 further comprises a driven sprocket or sheave 136 (FIG. 3) affixed to the driven shaft 135 which contacts and operates to drive the endless belt 122.

Still referring to FIG. 3, the center belt reel assembly 120 further includes a cam track 150 for guiding rotation of the endless belt 122. The cam track 150 includes a curved fore portion 152 complementary in shape to a curved fore portion 154 of the first and second reels 110A, 110B, and a non-circular aft portion 156. For example, in the present exemplary embodiment, the aft portion of the cam track can have a substantially triangular side profile. The cam track 150 guides the belt 122 such that the lugs 124 project outwardly from the first and second reels from approximately a 6 o'clock to a 12 o'clock position of the curved fore portion 152 of the cam track to harvest crop between the first and second reels that is not harvested by the first and second reels.

Figure 4:
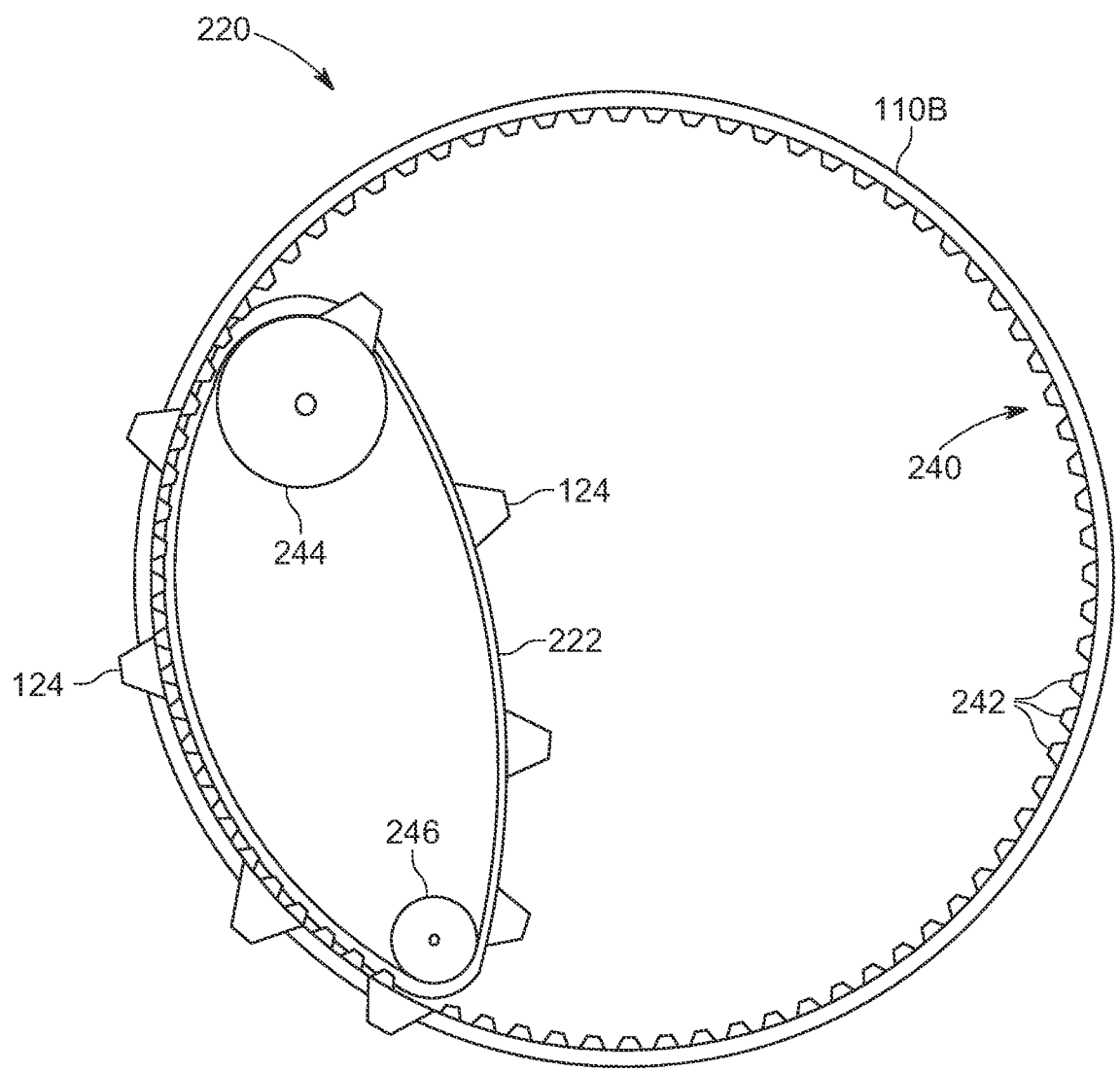
FIG. 4 is a side view of a first reel and a center belt reel assembly of a header in accordance with another exemplary embodiment of the subject disclosure with certain elements omitted for purposes of illustration.
Figure 5:
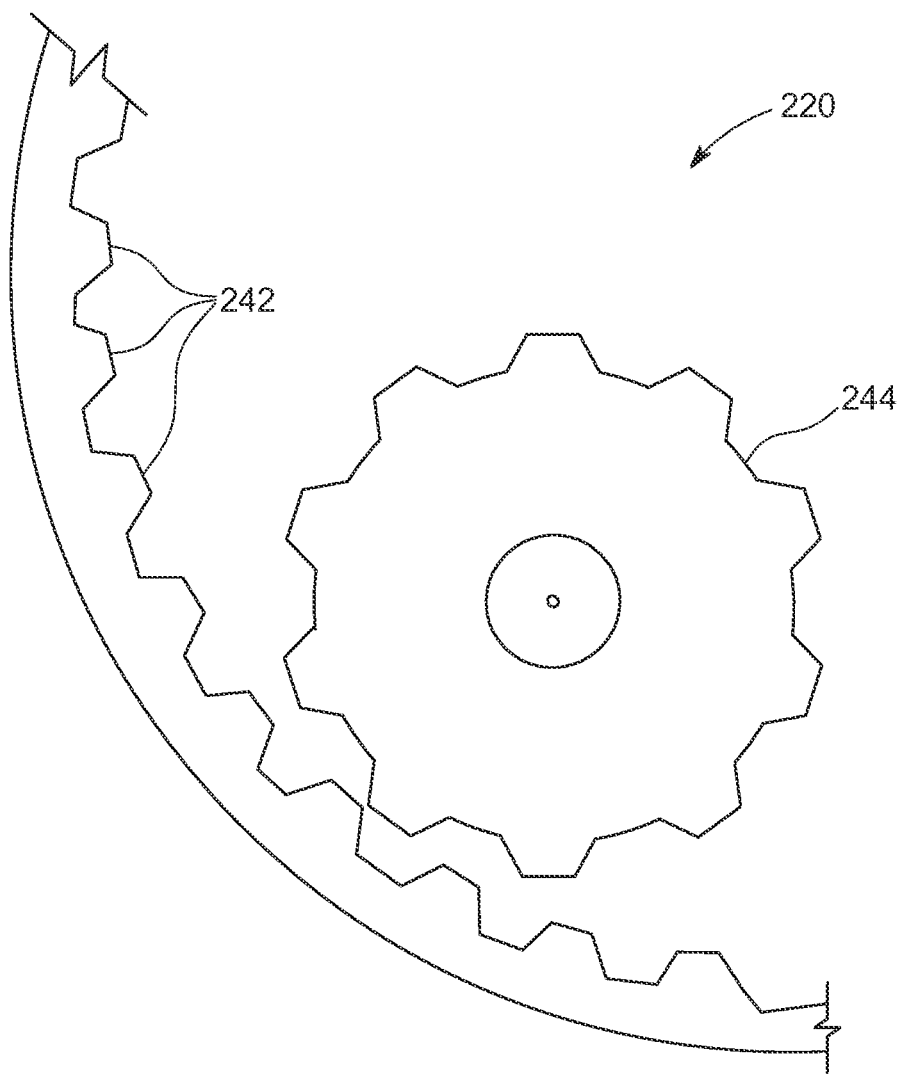
FIG. 5 is an enlarged view of a segment of a first reel drive gear and a driven sprocket of FIG. 4 with certain elements omitted for purposes of illustration.

FIGS. 4 and 5 illustrate another exemplary embodiment of a center belt reel assembly 220 in accordance with the subject disclosure. The center belt reel assembly 220 includes a reel gear 240 provided on one of the first and second reels 110A, 110B. The center belt reel assembly 220 also includes a driven gear 244 which is operatively engaged with and driven by the reel gear 240 as the reel rotates. According to an aspect, the reel gear 240 comprises a plurality of radially inwardly directed teeth 242 circumscribing an overall circumference of the medial end of either the first or the second reel, e.g., reel 1108. The driven gear 244 of the center belt reel assembly 220 is operatively engaged with an endless belt 222, which is rotationally driven by the driven gear. The center belt reel assembly also includes an idler sheave 246 operatively engaged with the endless belt 222 and cooperating with the driven gear to maintain tension in the endless belt.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A header for an agricultural harvester comprising:
    a first reel;
    a second reel spaced from the first reel a predetermined distance; and
    a center belt reel assembly sandwiched between the first and second reels, the center belt reel assembly comprising:
        an endless belt rotationally driven about a rotational axis substantially parallel to a central rotational axis of one of the first and second reels, wherein the endless belt has a width that extends substantially the predetermined distance, and
    wherein the center belt reel assembly is driven by the first and/or second reels.

2. The header of claim 1, wherein the center belt reel assembly further comprises a drive for driving rotation of the endless belt.

3. The header of claim 2, wherein the drive comprises a reel drive shaft.

4. The header of claim 1, wherein the center belt reel assembly further comprises a cam track for guiding rotation of the endless belt.

5. The header of claim 1, wherein the cam track includes a curved fore portion complementary to a curved fore portion of one of the first and second reels, and a non-circular aft portion.

6. The header of claim 1, wherein the center belt reel assembly further comprises a driven sprocket, and wherein one of the first and second reels comprises a drive gear set operatively engaged with the driven sprocket for driving rotation thereof.

7. The header of claim 6, wherein the drive gear set is adjacent a medial end of one of the first and second reels.

8. The header of claim 1, wherein the center belt reel assembly further comprises a driven sheave and an idler sheave, and wherein one of the first and second reels comprises a drive sprocket set operatively engaged with the driven sheave for driving rotation thereof.

9. The header of claim 1, wherein the endless belt is a V-belt, a flat belt, or a cog belt.

10. The header of claim 1, wherein the endless belt includes lugs.

11. The header of claim 1, further comprising a center reel support supporting the center belt reel assembly.

12. The header of claim 11, wherein the center reel support comprises a fore end including a first through opening rotatably receiving medial ends of reel drive shafts of the first and second reels, and an aft end including a second through opening for rotatably receiving a driven shaft.

13. The header of claim 12, further comprising a sprocket or sheave affixed to the driven shaft and operating to drive the endless belt.

14. An agricultural harvester comprising the header of claim 1.

15. The header of claim 1 further comprising a draper belt for transporting crops toward a feederhouse of the agricultural harvester, wherein the center belt reel assembly is separate from the draper belt.

16. A header for an agricultural harvester comprising:
    a first reel;
    a second reel spaced from the first reel a predetermined distance; and
    a center belt reel assembly sandwiched between the first and second reels, the center belt reel assembly comprising:
        an endless belt rotationally driven about a rotational axis substantially parallel to a central rotational axis of one of the first and second reels, wherein the endless belt has a width that extends substantially the predetermined distance, and
    wherein the center belt reel assembly is circumscribed by the first or second reels, as viewed from a side of the first or second reels.

17. A header for an agricultural harvester comprising:
    a first reel;
    a second reel spaced from the first reel a predetermined distance; and
    a center belt reel assembly sandwiched between the first and second reels, the center belt reel assembly comprising:
        an endless belt rotationally driven about a rotational axis substantially parallel to a central rotational axis of one of the first and second reels, wherein the endless belt has a width that extends substantially the predetermined distance,
    wherein the center belt reel assembly further comprises a drive for driving rotation of the endless belt, and
    wherein the drive is positioned at an elevation above an axis of rotation of the first and/or second reels.

* * * * *